United States Patent [19]
Morohashi

[11] Patent Number: 5,398,192
[45] Date of Patent: Mar. 14, 1995

[54] METHOD OF MANUFACTURING CORRECTION LENS FOR FORMING PHOSPHOR SCREEN ON FACEPLATE OF COLOR CATHODE RAY TUBE

[75] Inventor: Katsuei Morohashi, Saitama, Japan

[73] Assignee: Kabushiki Kaisha Toshiba, Kawasaki, Japan

[21] Appl. No.: 139,052

[22] Filed: Oct. 21, 1993

Related U.S. Application Data

[63] Continuation of Ser. No. 41,345, Apr. 1, 1993, abandoned, which is a continuation of Ser. No. 573,699, Aug. 28, 1990, abandoned.

[30] Foreign Application Priority Data

Aug. 30, 1989 [JP] Japan .................. 1-223860

[51] Int. Cl.⁶ .................. G06F 15/46; G03B 41/00
[52] U.S. Cl. .................. 364/468; 354/1; 430/24; 359/742
[58] Field of Search .......... 364/468; 430/23-26; 354/1; 395/741-743, 601, 718, 738, 457

[56] References Cited

U.S. PATENT DOCUMENTS

| | | | |
|---|---|---|---|
| 3,628,850 | 12/1971 | Yamazaki et al. | 350/175 R |
| 4,052,123 | 10/1977 | Yamazaki et al. | 350/189 |
| 5,122,819 | 6/1992 | Sato | 354/1 |
| 5,132,187 | 7/1992 | Morohashi | 430/24 |

FOREIGN PATENT DOCUMENTS

| | | |
|---|---|---|
| 47-40983 | 10/1972 | Japan . |
| 49-22770 | 6/1974 | Japan . |
| 62-154525 | 7/1987 | Japan . |
| 294337 | 4/1990 | Japan . |

OTHER PUBLICATIONS

E. D. Huber, "Extrapolated least-squares opimization in optical design", Journal of the Optical Society of America A, vol. 2, No. 4, Apr. 1985, pp. 544-554, Woodbury, N.Y.

Yamazaki et al, "A Segmented Lens for Improving Color Television Dot Patterns", Journal of the Society of Motion Picture Television Engineers, vol. 82, No. 3, Mar. 1973, pp. 149-150.

*Primary Examiner*—Roy N. Envall, Jr.
*Assistant Examiner*—Thomas E. Brown
*Attorney, Agent, or Firm*—Cushman, Darby & Cushman

[57] ABSTRACT

In a method of manufacturing a correction lens for exposing a phosphor screen of a cathode ray tube, an effective surface of the correction lens is divided into a plurality of regions and an orbit of light beam corresponding to an orbit of electron beam is analyzed for each of regions to determine segment surface equation in the same expression form for the respective regions. A final surface equation is derived from the segment surface equations in consideration of an allowable error and the correction lens is formed on the basis of the final surface equation.

8 Claims, 3 Drawing Sheets

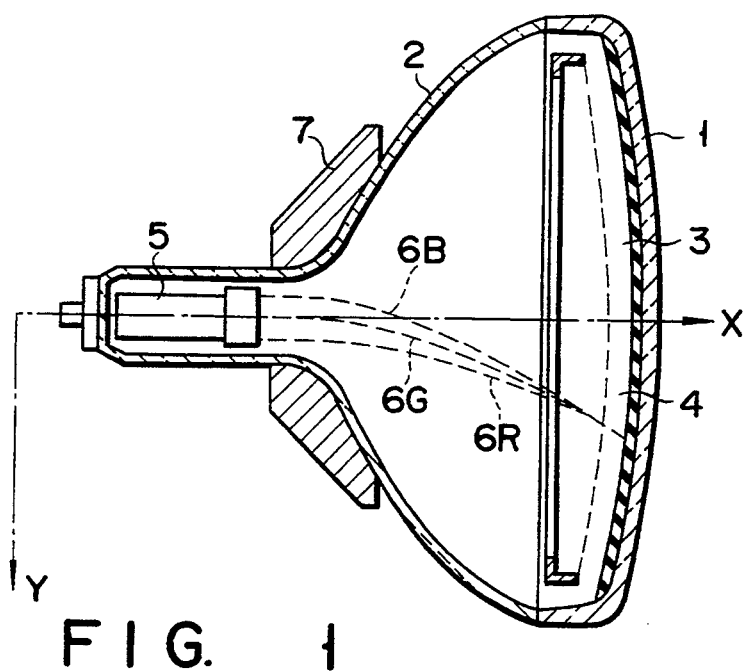
FIG. 1
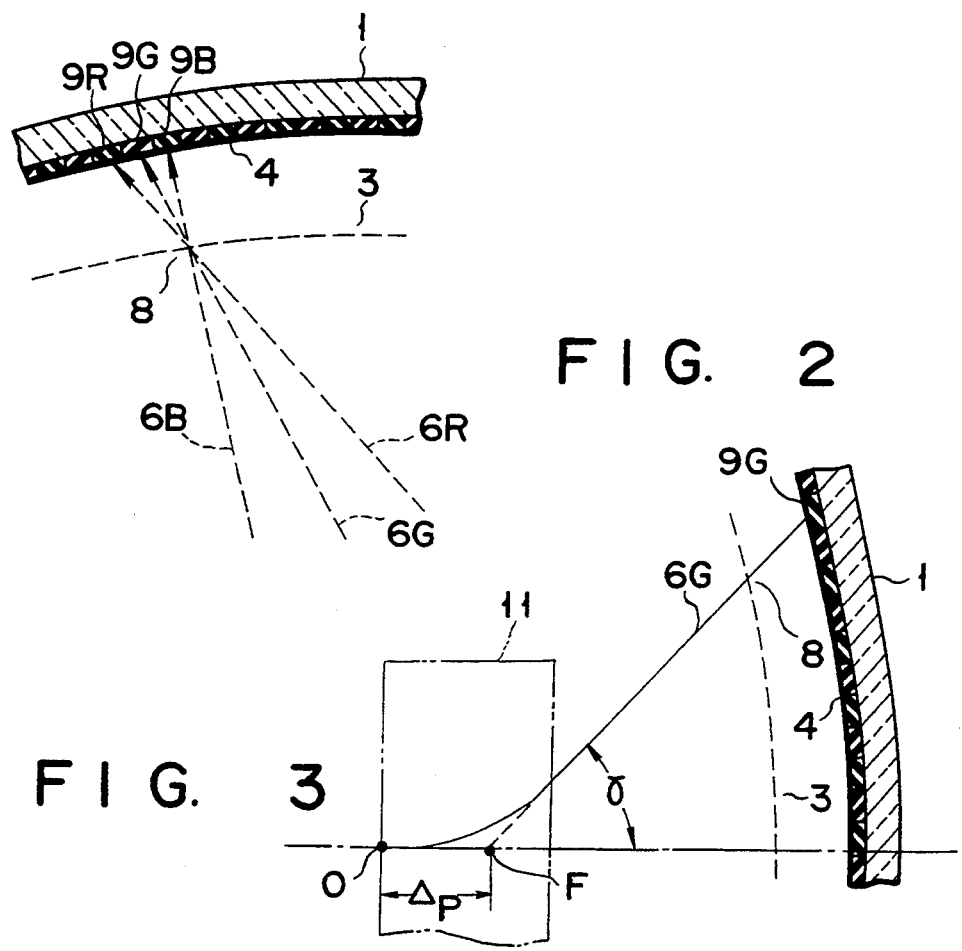
FIG. 2
FIG. 3

METHOD OF MANUFACTURING CORRECTION LENS FOR FORMING PHOSPHOR SCREEN ON FACEPLATE OF COLOR CATHODE RAY TUBE

This is a continuation of application Ser. No. 08/041,345, filed Apr. 1, 1993, abandoned, which is a continuation of application Ser. No. 07/573,699, filed on Aug. 28, 1990, which was abandoned upon the filing hereof.

BACKGROUND OF THE INVENTION

1. Field of the Invention

The present invention relates to a method of manufacturing a correction lens for forming a phosphor screen on a faceplate of a color cathode ray tube.

2. Description of the Related Art

As shown in FIG. 1, a color cathode ray tube generally has an envelope constituted by a panel 1 and a funnel 2. A phosphor screen 4 is formed on the inner surface of a faceplate of the panel 1 to oppose a shadow mask 3 mounted inside the panel a large number of apertures for passing electron beams. The phosphor screen 4 is formed of stripe- or dot-like 3-color phosphor layers for emitting blue, red, and green light rays. In order to improve contrast of an image formed on the phosphor screen 4, non-light-emitting layers mainly consisting of carbon may be formed between the 3-color phosphor layers. A screen of this type is known as a so-called black stripe type or black matrix type screen.

Three electron beams 6B, 6G, and 6R emitted from an electron gun assembly 5 are horizontally and vertically deflected by a magnetic field generated by a deflection yoke 7 mounted outside the funnel 2, and the phosphor screen 4 is scanned by the deflected electron beams, thereby displaying an image on the screen 4.

In order to display an image having high color purity on the phosphor screen 4, as shown in FIG. 2, the electron beams 6B, 6G, and 6R passing through a given aperture 8 formed in the shadow mask 3 must be correctly incident on corresponding phosphor layers 9B, 9G, and 9R, respectively. As the electron beams 6B, 6G, and 6R are deflected, i.e., deflection angles of the beams are changed, centers of deflection of apparent electron beams are changed along the tube axis. Therefore, the 3-color phosphor layers 9B, 9G, and 9R must be formed at specific aligning pitches for each aperture 8 of the shadow mask 3. That is, in order to allow the electron beams 6B, 6G, and 6R to be correctly incident on the corresponding phosphor layers 9B, 9G, and 9R, respectively, formation positions of the phosphor layers 9B, 9G, and 9R with respect to the apertures 8 of the shadow mask 3 must be continuously changed on the inner surface of the panel 1.

FIG. 3 shows an orbit of the center beam 6G of the three electron beams aligned in a line emitted from an in-line type electron gun assembly. As shown in FIG. 3, assuming that the magnetic field intensity of the deflection coil 7 is uniform, the electron beam 6G propagates along a substantially circular orbit in a deflection yoke magnetic field 11, propagates straight from the magnetic field 11, and is incident on the phosphor layer 9G through the aperture 8 of the shadow mask 3. Therefore, an apparent emission position of the electron beam 6G, i.e., a position of a deflection center (F) at which an extended line of a straight orbit crosses the tube axis (X axis) is changed in accordance with a deflection angle $\gamma$. That is, the cathode ray tube apparatus has a $\gamma$-$\Delta p$ characteristic in which the deflection center (F) moves toward the phosphor screen 4 by $\Delta p$ when the deflection angle is $\gamma$ with respect to a deflection center O obtained when the deflection angle is zero, i.e., in a non-deflection state.

In a conventional method, a phosphor slurry mainly consisting of a phosphor and a light-sensitive resin is coated and dried on the inner surface of a panel, the obtained film is exposed through a shadow mask to bake patterns corresponding to all apertures formed in the shadow mask, and the resultant material is developed to remove a non-exposed portion, thereby forming a phosphor layer of an arbitrary color. The above steps are repeatedly performed for phosphor layers of three colors to form a phosphor screen. Especially in a black stripe or black matrix type phosphor screen, prior to formation of 3-color phosphor layers, a light-sensitive resin is coated on the inner surface of the panel to form a pattern of the light-sensitive resin corresponding to the apertures of the shadow mask in a prospective 3-color phosphor layer formation region by a method similar to formation of the phosphor layers as described above. Thereafter, a non-light-emitting paint is coated, and the film of this non-light-emitting paint is removed together with the light-sensitive resin pattern, thereby forming non-light-emitting layers with gaps in the prospective 3-color phosphor layer formation position. Thereafter, the 3-color phosphor layers are formed between the non-light-emitting layers by the above phosphor layer formation step to form a phosphor screen.

In an exposure step for any of the phosphor layers and the non-light-emitting layers, light rays for exposing the film formed on the panel inner surface propagate straight. Therefore, as shown in FIG. 4, a correction lens 15 is arranged between the panel 1 mounting that encloses the shadow mask 3 and an exposure light source 13 to approximate an orbit of light rays 14 emitted from the light source 13 to an orbit of electron beams emitted from the electron gun assembly.

A spherical lens is conventionally used as the correction lens 15. As the structure of the color cathode ray tube is complicated, however, a simple lens cannot create the $\gamma$-$\Delta p$ characteristic. Therefore, an aspherical lens having a complicated surface shape is currently used.

If the surface shape of the aspherical lens is represented by an orthogonal coordinate system (X,Y,Z) having the center of the bottom surface of the lens as its origin, a surface height x at a given point is represented by:

$$x = f(y,z) \qquad (1)$$

In a polar coordinate system $(r,\theta)$, x is represented by:

$$x = f(r,\theta) \qquad (2)$$

$$r = \sqrt{y^2 + z^2}, \quad \theta = \tan^{-1}(y/z)$$

In general, equation (1) is represented by the following polynomial:

$$x = \sum_{i,j=0}^{m} a_{ij} \cdot y^i \cdot z^j \qquad (3)$$

In design of the correction lens performed by using the above equations, a change in the light rays emitted from the exposure light source with respect to a change amount of the coefficient $a_{ij}$ is tracked throughout the entire surface of the phosphor screen. As a result, the correction lens is designed such that errors between incident positions of the electron beams on the entire surface of the phosphor screen and a phosphor layer on which the electron beams are to be landed are set to be a predetermined value or less, normally, 10 μm or less. When the correction lens is designed by this method, errors at a limited small number of points on the correction lens can be comparatively easily reduced. However, even if the coefficient $a_{ij}$ is set to reduce an error at a given point on the correction lens surface, the coefficient $a_{ij}$ generally functions to increase errors at most of other points. Therefore, it is very difficult to design the correction lens such that errors at all the points on the phosphor screen are set to be a desired value or less. Even if a high-performance high-speed computer is used, not only design is time-consuming, but also changing or setting of the coefficient $a_{ij}$ requires determination based on rich experiences in many cases.

In a color cathode ray tube having a complicated deflection magnetic field such as a 110°-deflection, a color cathode ray tube having a large deflection angle, or a large-size color cathode ray tube, it takes a long time to design the correction lens, and it is difficult to manufacture the correction lens having a desired $\gamma$-$\Delta p$ characteristic.

Published Examined Japanese Patent Application No. 47-40983 or 49-22770 discloses another correction lens designing method. In this method, as shown in FIGS. 5A and 5B, an effective surface of a correction lens 15 is divided into a plurality of regions, and inclination of the surface is determined for each region. In this method, since an orbit of light rays can be precisely approximated to an orbit of electron beams in units of divided regions, a correction lens which comparatively satisfies the $\gamma$-$\Delta p$ characteristic can be made.

In this correction lens 15, however, steps 17 are formed in boundary portions between the divided regions. Therefore, exposure variation is easily produced by non-uniformity in light amount caused by the steps 17 on a black stripe or black matrix type phosphor screen in which non-light-emitting layers are formed between the 3-color phosphor layers. In order to solve this problem, the correction lens 15 may be tilted or the steps may be shielded from light during exposure. In either method, however, the exposure variation on the phosphor screen cannot be satisfactorily eliminated.

The present inventor, therefore, proposed a correction lens in Japanese Patent Application No. 63-247192. In this correction lens, an effective surface of the lens is divided into a plurality of regions similar to the correction lens having a plurality of regions, the $\gamma$-$\Delta p$ characteristic is set to minimize a landing error for each region, and no step is formed in boundary portions between the regions.

When such a correction lens is used, a phosphor screen which satisfies landing characteristics and is free from exposure variation can be formed without tilting a light source. Since, however, this correction lens requires surface equations representing surface shapes in a number corresponding to the number of divided regions, a long time and a lot of labors are required in the manufacture of the correction lens.

As described above, in a phosphor screen of a color cathode ray tube, when a pattern corresponding to apertures of a shadow mask is to be baked on a film formed on the inner surface of a panel and consisting of a phosphor slurry or a light-sensitive resin, a correction lens for approximating an orbit of light rays radiated from an exposure light source to that of electron beams deflected by a magnetic field formed by a deflection yoke is used. Since, however, the surface shape of this correction lens is complicated, it is difficult to design a correction lens so that good landing is obtained throughout the entire phosphor screen. Therefore, a desired correction lens cannot be manufactured for a phosphor screen of especially a color cathode ray tube having a complicated deflection magnetic field such as a color cathode ray tube having a wide deflection angle or a large-size cathode ray tube.

As a correction lens for solving the above problem, a correction lens in which its effective surface is divided into a plurality of regions so that each region satisfies a $\gamma$-$\Delta p$ characteristic is disclosed in each Published Examined Japanese Patent Application Nos. 47-40983 and 9-22770 and Japanese Patent Application No. 63-247192.

Of these correction lenses having divided regions, since each of the correction lenses disclosed in Published Examined Japanese Patent Application Nos. 47-40983 and 49-22770 has steps in boundary portions between the divided regions, exposure variation is easily produced due to non-uniformity in light amount caused by the steps. Since, however, the correction lens disclosed in Japanese Patent Application No. 63-247192 proposed by the present inventor has no step in boundary portions between the divided regions, a phosphor screen free from exposure variation can be manufactured. However, this correction lens requires surface equations representing surface shapes in a number corresponding to the number of the divided regions. Therefore, a long time period and a lot of labors are required in the manufacture of this correction lens.

SUMMARY OF THE INVENTION

It is an object of the present invention to provide a method of easily manufacturing a correction lens which is divided into a plurality of regions each satisfying a $\gamma$-$\Delta p$ characteristic and has no steps in boundary portions between the divided regions.

According to the present invention, there is provided a method of manufacturing a correction lens for approximating an orbit of light rays emitted from an exposure light source to an orbit of electron beams in a color cathode ray tube, thereby exposing a phosphor screen of the cathode ray tube, comprising the steps of:

dividing an effective surface of a correction lens to be manufactured into a plurality of regions;

analyzing the orbit of light rays corresponding to the orbit of electron beams for each of the plurality of divided regions to determine segment surface equations in the same expression form for the respective regions;

approximating the effective surface of the lens represented by a plurality of segment surface equations determined for the plurality of regions to final surface equations which can represent the effective surface by not more than an allowable error; and manufacturing the correction lens on the basis of the final surface equations.

In the above manufacturing method, surface equations represented by the same expression form are determined in a one-to-one correspondence with a plurality of divided regions, and the effective surfaces of the lens represented by a plurality of surface equations are approximated to a single surface equation which can represent the effective surfaces by an allowable error or less. Therefore, since the surface equation is determined in correspondence with the surface shape of each region, a problem of a conventional method in which a landing error cannot be reduced because the entire effective surface of the lens is defined by a single surface equation is solved, and an orbit of light rays can be allowed to coincide with that of electron beams with sufficient precision. In addition, in the manufacture of a lens according to a conventional method, a long time and a lot of labors are required to input data in a processing machine because a plurality of surface equations have a large number of coefficients. According to the present invention, however, a probability of such inconvenience or a processing stop caused by an input error can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a sectional view schematically showing a conventional color cathode ray tube;

FIG. 2 is a partial sectional view for explaining a positional relationship between 3-color phosphor layers and apertures of a shadow mask of a phosphor screen shown in FIG. 1;

FIG. 3 is a view schematically showing a center electron beam deflected by a deflection magnetic field in the cathode ray tube shown in FIG. 1;

DETAILED DESCRIPTION OF THE PREFERRED EMBODIMENTS

Figure 4:
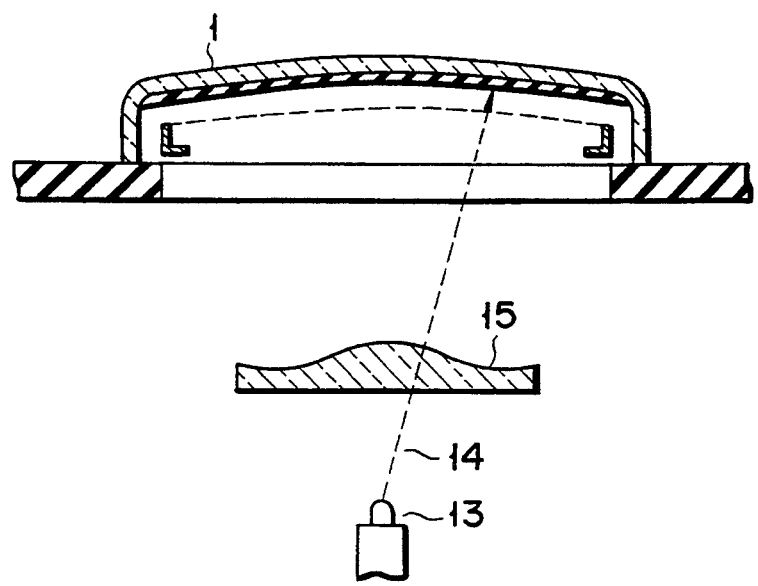
FIG. 4 is a sectional view schematically showing an exposure apparatus for exposing a conventional phosphor screen.
Figure 5A:
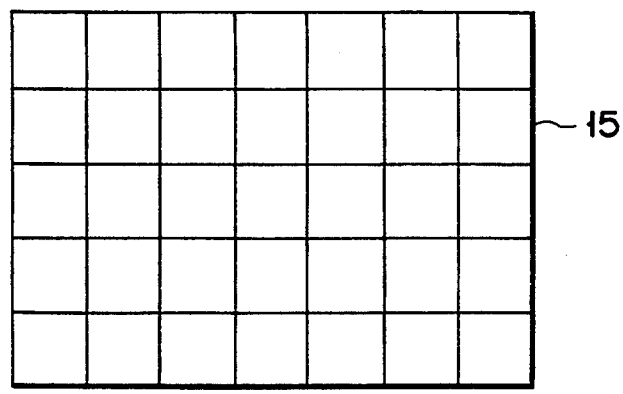
FIGS. 5A and 5B are respectively plan and sectional views schematically showing a conventional correction lens to be incorporated in the exposure apparatus shown in FIG. 4 and having divided regions.
Figure 5B:
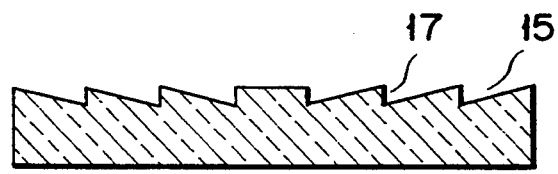
Figure 6A:
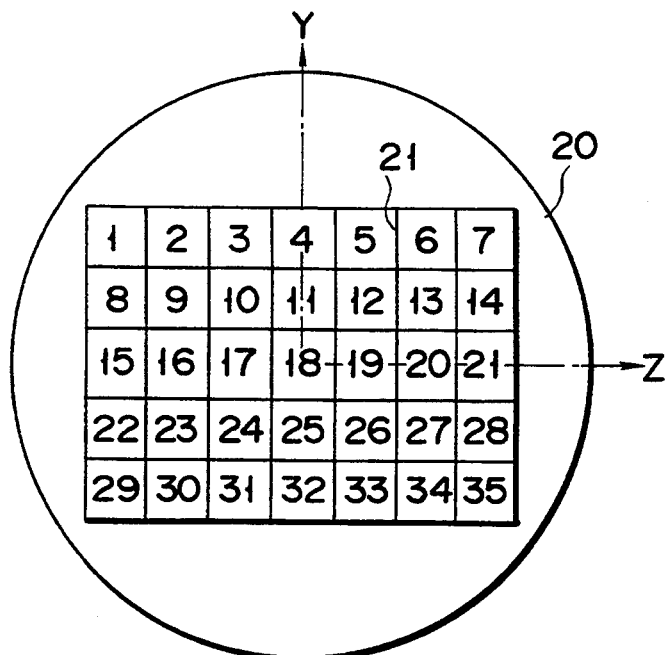
FIGS. 6A, 6B, and 6C a plan view schematically showing a correction lens according to an embodiment of the present invention, a sectional view taken along an X-Z plane, and a sectional view taken along an X-Y plane, respectively.
Figure 6B:
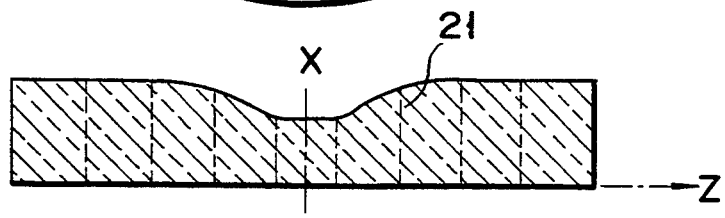
Figure 6C:
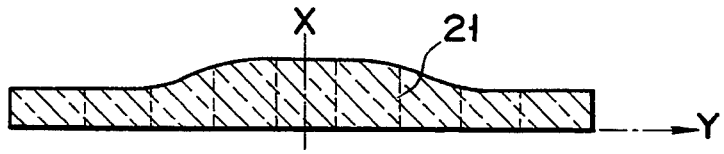

A correction lens according to an embodiment of the present invention will be described below with reference to the accompanying drawings.

FIG. 1 shows a correction lens according to an embodiment of the present invention. Although an arrangement of a correction lens varies in accordance with the type of a tube, i.e., the size of a phosphor screen to be formed, this correction lens consists of glass having a diameter of 300 mm and a thickness of 10 mm, and its effective surface 20 is divided into five sections in the longitudinal direction and seven sections in the lateral direction to form 35 regions from regions 1 to 35 since an aspect ratio of the screen of a color cathode ray tube is generally 4:3. Each region has a size of 30 mm × 30 mm.

The regions 1 to 35 of this correction lens have surface shapes determined by surface equations represented by the same expression form determined by an X-Y-Z orthogonal coordinate system having the center of the bottom surface of the lens as its origin so that an orbit of light rays emitted from an exposure light source to reach the inner surface of a panel through each region coincides with that of electron beams emitted from an electron gun assembly of the color cathode ray tube and deflected by a deflection magnetic field of a deflection yoke to reach the panel inner surface within a predetermined error range. That is, if the surface shape of a region 20 is represented by the following surface equation:

$$x = f_{20}(y, z) \tag{4}$$

and expressed by the following polynomial:

$$x = a_0 + a_1 y + a_2 z + a_3 y^2 + a_4 yz + a_5 z^2 \tag{5}$$

the surface shapes of all other regions are represented by similar surface equations. In addition, since the lens thicknesses are equal to each other at boundaries 21 between the regions 1 to 35 and the adjacent regions, the lens surface is formed to have an discontinuous structure having different inclination angles in the boundaries 21 by having no step between the adjacent regions.

In order to design this correction lens, the orbit of light rays emitted from the exposure light source is tracked to determine the surface equation of an arbitrary region. For example, if $f_{20}(y,z)$ of the surface equation (4) of the region 20 located on the Z axis is represented by the polynominal (5), the surface shapes of all the other regions can be expressed by changing only coefficients $a_0$ to $a_5$ of the polynomial (5).

Then, the surface shapes of the regions 1 to 35 are approximated to a single surface equation which can represent the surface shapes by an allowable error or less. As a first method for this purpose, data representing the lens thicknesses of the boundaries between the regions 1 to 35 are approximated by the method of least squares.

For example, assuming that data representing the lens thicknesses at the boundaries between the regions 1 to 7 including two end portions is:

$$x_{1,1}, x_{1,2}, \ldots, x_{1,8}$$

the following equation is obtained by approximating the above data to an equation of the fifth order by the method of least squares:

$$x = \sum_{i=1}^{5} a_{i,1} z^{i-1} \tag{6-1}$$

Similarly, assuming that data representing the lens thicknesses at the boundaries between the regions 8 to 14 is:

$$x_{2,1}, x_{2,2}, \ldots, x_{2,8}$$

the following equation is obtained:

$$x = \sum_{i=1}^{5} a_{i,2} z^{i-1} \quad (6\text{-}2)$$

The regions 15 to 21, 22 to 28, and 29 to 35 are similarly approximated as follows:

$$x = \sum_{i=1}^{5} a_{i,3} z^{i-1} \quad (6\text{-}3)$$

for the regions 15 to 21:

$$x = \sum_{i=1}^{5} a_{i,4} z^{i-1} \quad (6\text{-}4)$$

for the regions 22 to 28, and:

$$x = \sum_{i=1}^{5} a_{i,5} z^{i-1} \quad (6\text{-}5)$$

for the regions 29 to 35. That is, the lens thicknesses at the boundaries between the regions 1 to 35 are determined by $5 \times 6 = 30$ coefficients of the above five equations.

Assuming that the data of the lens thickness represents a thickness on the surface cut by a plane parallel to the Z axis perpendicular to the Y axis, in particular, that the data of the lens thickness of the regions 15 to 21 represent a value on the z axis, the coefficient $a_{i,3}$ of the equation (6-3) represents data obtained when the correction lens is cut along a plane represented by $y=0$. Therefore, the Z coordinates of the planes for determining the coefficients are:

y1 for $a_{i,1}$
y2 for $a_{i,2}$
y3 for $a_{i,3}$
y4 for $a_{i,4}$
y5 for $a_{i,5}$ and each coefficient is approximated by the y coordinate. For example, when the coefficients $a_{i,1}$ ($a_{1,1}$ to $a_{1,5}$) are approximated as follows:

$$a_{1,n} = \sum_{j=1}^{4} b_{i,j} y_n^{j-1} \quad (n = 1 \text{ to } 5) \quad (7)$$

the coefficients $a_{1,1}$ to $a_{1,5}$ are represented by $b_{1,1}$ to $b_{1,4}$, and the surface shape of the lens can be determined $6 \times 4 = 24$ coefficients.

In actual manufacture of the correction lens, a lens material consisting of glass is ground by a computer-controlled grinder and abraded on the basis of the above design.

In the above embodiment, the correction lens is divided into 35 regions, and a surface equation is determined for each region. Therefore, no big difference is present between a method in which the 35 surface equations are directly processed and a method in which the surface equations of the respective regions are approximated by a single surface equation to process 20 coefficients of the equation. Since, however, the difference between the two methods is increased as the number of divided regions is increased, data input to a processing machine or the like can be performed within a short time period to allow the manufacture of a desired correction lens at a high speed with high precision.

In the above embodiment, the effective surface of the correction lens is divided into regions each having a size of 30 mm×30 mm. If, however, the size of each divided region is increased, an error in a boundary portion between the regions is increased to degrade precision. If the divided region is too small, calculation of surface equations takes a long time period since the number of regions is increased. If the region is smaller than a tool for manufacturing the lens, it is impossible to precisely form both the surface thickness and the inclination. Therefore, the size of the divided region of the correction lens is preferably 10 mm×10 mm to 3 mm×3 mm, and more preferably, 8 mm×8 mm.

When the inclination of the surface of each region is increased, the discontinuity in the boundary portion is increased to produce a portion exposed by converged light rays and a portion exposed by divergent light rays upon exposure, thereby producing exposure variation in phosphor layers. As a result, luminance variation or color emission variation is easily produced on the screen of a completed tube. Therefore, the inclination of the surface of each region is preferably set to be 20° or less between adjacent regions.

Figure 7:
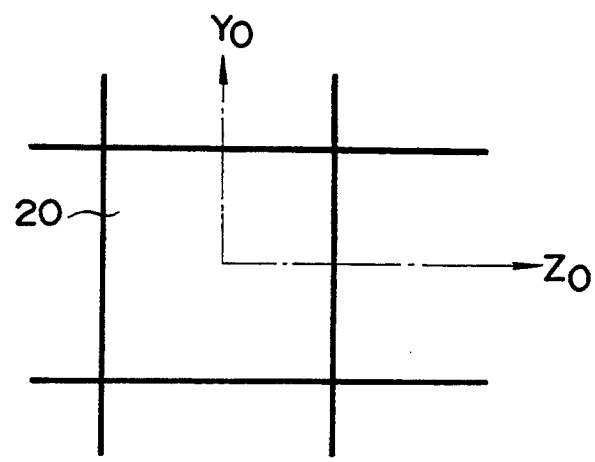
FIG. 7 is a view for explaining another coordinate system for representing the surface shape of a divided region of the correction lens.

In the above embodiment, the surface equation of each divided region is expressed by the orthogonal coordinate system having the center of the bottom surface of the correction lens as its origin. However, as shown in FIG. 7, this surface equation of the region may be expressed by setting a coordinate system for each region 22, e.g., by an orthogonal coordinate system (Y0,Z0) having the center of the bottom surface of the region 22 as its origin as shown in FIG. 7.

According to the present invention as described above, the effective surface of the correction lens for approximating an orbit of light rays emitted from the exposure light source to that of electron beams emitted from the electron gun assembly of the color cathode ray tube is divided into a plurality of regions, and the orbit of light rays with respect to the orbit of electron beams is tracked for each region, thereby determining surface equations in the same expression form in a one-to-one correspondence with a plurality of divided regions. The effective surfaces of the lens represented by a plurality of surface equations are approximated by a single surface equation which can represent the effective surfaces by an allowable error or less, and a correction lens is manufactured on the basis of the approximation surface equation. Therefore, by setting a surface equation corresponding to the surface shape of each region, a problem of a conventional lens in which the entire effective surface of the lens is defined by a single surface equation can be solved to allow the orbit of light rays to coincide with that of electron beams with high precision. In addition, in the manufacture of the lens, a possibility of conventional inconvenience can be reduced in which a long time period and a lot of labors are required to input data to a processing machine since a plurality of surface equations have a large number of coefficients or processing stop caused by an input error. As a result, a desired correction lens having high precision can be manufactured within a short time period.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing a correction lens for causing an orbit of light rays emitted from an exposure light source to approximate an orbit of electron beams in a color cathode ray tube, thereby exposing a pattern on a phosphor screen of the cathode ray tube, the method comprising the steps of:

determining an effective surface size of an effective surface of the correction lens to be manufactured;

dividing the effective surface of the correction lens defined by the effective surface size into a plurality of regions;

comparing the orbit of light rays to the orbit of corresponding electron beams for each of the plurality of regions to determine a plurality of segment surface equations;

determining coefficients of the plurality of segment surface equations in a manner that thicknesses on opposite sides of boundaries between adjacent regions of the correction lens are equal to each other;

approximating final surface equations in a manner that the boundaries between adjacent regions of the correction lens are smoothly and continuously coupled and further in a manner that an error between the light ray orbit and the electron beam orbit is within an allowable error range; and manufacturing the correction lens on the basis of the final surface equations.

2. A method according to claim 1, wherein said effective surface has a center, and the surface equation of each of said plurality of regions is represented by an equation having the center of said effective surface.

3. A method according to claim 1, wherein each of said plurality of regions has a center, and the surface equation of each of said plurality of regions is represented by an equation having the center as an origin.

4. A method according to claim 1, wherein the final surface equations are obtained by approximating said plurality of segment surface equations by a method of least squares.

5. A method according to claim 1, wherein each region has a size of 10 mm × 10 mm to 3 mm × 3 mm.

6. A method according to claim 5, wherein each region has a size of substantially 8 mm × 8 mm.

7. A method according to claim 1, wherein said effective surface of said correction lens is determined such that a difference between inclination angles between adjacent regions is not more than 20°.

8. A method according to claim 1, further comprising a polynomial equation:

$$x = a0 + a1y + a2z + a3y^2 + a4yz + a5z^2$$

wherein a0 to a5 are the coefficients of the segment surface equations and x, y, and z are coordinates of the correction lens.

* * * * *